Oct. 21, 1969     F. LECKELL     3,473,250

FISH ALARM

Filed Oct. 16, 1967

INVENTOR.
FRANK LECKELL
BY Lyle M. Shields
ATTORNEY

United States Patent Office 3,473,250
Patented Oct. 21, 1969

3,473,250
FISH ALARM
Frank Leckell, 5142 SW. 3rd Ave.,
Cape Coral, Fla. 33904
Filed Oct. 16, 1967, Ser. No. 675,589
Int. Cl. A01k 97/12
U.S. Cl. 43—17                                    3 Claims

ABSTRACT OF THE DISCLOSURE

A battery operated alarm device which includes a base upon which there may be mounted either a bell, buzzer or horn and which includes a receptacle for receiving the end of a fishing pole which is activated by a fish tugging upon the fishing line so as to sway the pole and move the receptacle into electrical contact to close a circuit from the battery to the warning signal.

---

This invention relates generally to fishing signal devices. A principal object of the present invention is to provide a fishing signal device or fish alarm which will indicate to a fisherman that a fish has been caught upon a fishing pole line.

Another object of the present invention is to provide a fish alarm to permit the fisherman to maintain a fishing pole unattended and wherein the fish alarm will sound or otherwise warn the fisherman when a fish has been hooked upon the line of the fishing pole.

Yet another object of the present invention is to provide a fish alarm which is adapted to receive the end of the fishing pole, and which is activated when the fishing pole is swayed, thus causing the closing of an electric circuit, connected either to a sounding bell, buzzer or horn, or if preferred, to a flashing red light.

Other objects of the present invention are to provide a fish alarm which is simple in design, inexpensive to manufacture, rugged in construction, easy to use and efficient in operation.

These and other objects will be readily evident upon a study of the following detailed description taken in connection with the accompanying drawing, wherein.

Figure 1:
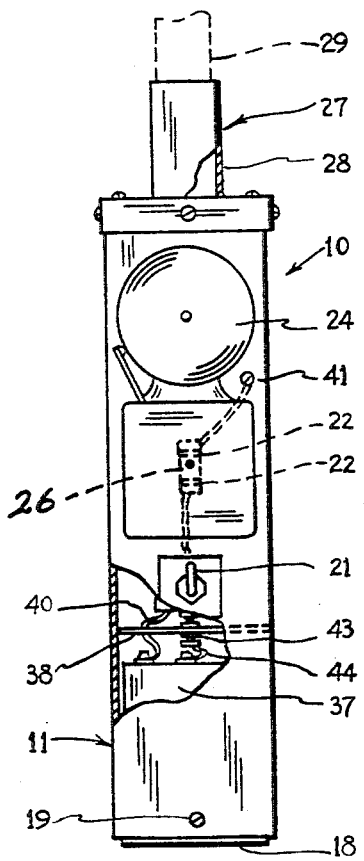
FIGURE 1 is a front elevation view of the present invention shown partly in cross-section.
Figure 3:
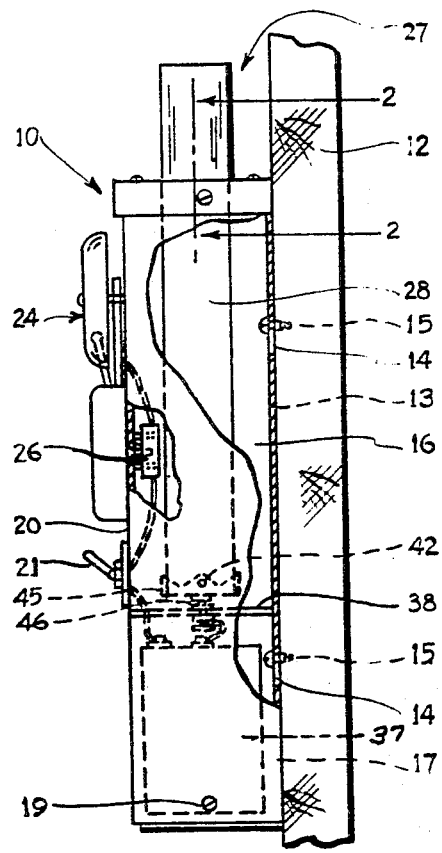
FIGURE 3 is a side elevation view of the present device shown partly in cross section.

Referring now to the drawing in detail, the reference numeral 10 represents a fish alarm according to the present invention wherein there is a housing 11 formed preferably from sheet metal which is adapted to be secured to a supporting post 12. Housing 11 comprises a generally rectangular member having a rear wall 13, and having a plurality of slots 14 therein, each of which may be of a bayonet type; the slots engage screws 15, secured in the side of the post 12.

The housing 11 includes a front wall 20, a central compartment 16, and a battery compartment 17 wherein a dry cell battery 37 may be placed, the battery compartment 17 having a removable bottom panel 18 formed with limited sidewalls extending upwardly inside the battery compartment to be secured by screws 19 to provide access to the battery for replacement. The central compartment 16 is closed at the bottom by a cross member 38.

Upon the front wall 20 of the housing 11 there is mounted an electric switch 21 which is in circuit with the battery 37 by means of the wire 40 which also connects with an electrical outlet receptacle 26 mounted on the inside of the front wall 20, which has aligned openings 22 therein for receiving the prongs 23 of various types of plug-in signal devices, such as bell 24, a lamp 25, a buzzer or horn (not shown). The prongs 23 of the signal device are engageable with the receptacle 26 contained within the compartment 16 and which forms an electrical circuit with the signal switch 21 and battery 37 to a ground connection on the housing as at 41.

Figure 2:
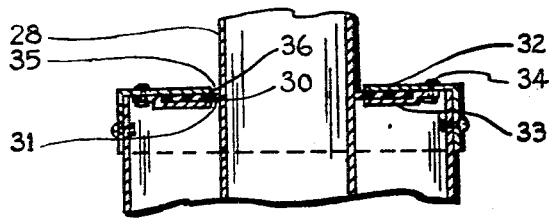
FIGURE 2 is a cross-sectional view taken along lines 2—2 of FIGURE 3, and showing the activating members for closing an alarm circuit when a fish has been caught.
Figure 4:
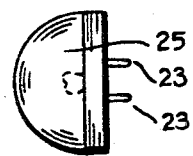
FIGURE 4 is a visual warning device which is adapted to substitute for a sounding alarm, if preferred.

In the upper end of the housing 11, there is located a fishing pole support 27, which is comprised of a tubular member or sleeve 28 into which the end of a fishing pole 29 may be inserted. The sleeve 28 which is of electric current-conducting material extends through an opening formed in the top wall 32 of the housing with the lower end 42 pivotally supported by member 38 but insulated therefrom by an insulating grommet 43. One side of battery 37 is electrically connected to the sleeve end 42 by a wire 44 connected to a metal cup 45 with a metal bolt 46 passing through grommet 43. The sleeve 28 is supported at its top within the opening 30 by a washer 31 made from electrically insulating material such as rubber or the like, and which is sufficiently resilient that it may be compressed under force to allow the sleeve to engage top wall 32 when moved by force applied to a fish pole 29 mounted therein such as a fish strike and with this engagement of the sleeve with the top wall caused by a fish strike coming from any angle will have the same effect. The washer 31 is supported on the underside of the top wall 32 of the housing, and secured in position by means of a bezel 33, secured by means of screws 34 to the top wall 32. As is clearly shown in FIGURE 2 of the drawing, there is normally a space 35 between the sleeve 28 and the edge 36 of a central opening in the top wall 32, the sleeve 28 and the top wall 32 being in the electrical circuit which activates the signal device, the top wall 32 being likewise of electrical conducting material.

In operative use, screws 15 are secured to the post 12 and the housing 11 is then hooked over the screws 15 by sliding the screws into the narrow ends of slots 14. After the fisherman has baited his hook at the end of the fishing line, secured to the end of a fishing pole 29, the pole is inserted into the sleeve 27 after which the switch 21 is moved into "On" position. The pole then need not be attended until a signal is produced to warn the fisherman that a fish has been caught. When the fish is hooked, it will cause the fishing pole to sway or otherwise move sidewise, so that the receptacle sleeve 28 is moved against the edge 36 of the top wall, thereby causing the electrical circuit to be closed between the battery and the signal device. Thus the fisherman is notified that a fish has been caught and he should then attend the fishing pole.

While various changes may be made in the detailed construction, it is understood that such changes will be made within the spirit and scope of the present invention.

I claim as my invention:

1. A combined fishing rod holder and a signal alarm device responsive to the sway of a fishing rod placed therein indicating a fish strike and adapted for attachment to a suitable supporting means, said device comprising a metal housing having a top wall apertured to receive a tube-like object, a cross member within said housing spaced downwardly of said top wall, a pole holder formed as a metal tube adapted for insertion through said aperture of the housing having a lower end insulated from and pivotally supported by said cross member and a top end extending through the aperture of said top wall and spaced out of contact therewith when centered in said aperture, a washer of compressible insulating material disposed adjacent said top wall and in contact with said tube for holding said tube in a non-contacting position with the side of said aperture, said washer being loosely held in place and adapted for compression to allow the tube to engage the housing when forced from its centered position, an electrical source disposed in said housing, a signal means carried by said housing, an electrical circuit means in circuit with said source, said signal means, said housing and said tube, so that a movement off-center of said tube, when swayed by a fish strike from any angle applied to a pole held thereby, acts to close said circuit and operate said alarm.

2. A signalling device to hold a fishing rod and indicate the occurrence of a fish strike upon a fishing line extending at any angle from said rod comprising a metal housing supported vertically, an opening formed in the top of said housing, a metal tube adapted to receive the handle of a fishing pole disposed in said housing with a bottom end pivotally secured within said housing and a top end extending through said opening in the housing, said housing and said tube being electrically conductive, signal means carried by said housing and an electrical source suitably mounted in said housing and in circuit with said signal means, housing and tube, said tube serving as a switch by maintaining an open circuit by normally being out of contact with the side of said opening but being adapted to engage the said side to effect a closed circuit upon pivotal movement of said tube effected by occurrence of a fish strike movement of a fishing pole placed therein.

3. A fishing rod holder and signalling device in accordance with claim 2 wherein said signal means is comprised of an electrical outlet and a plug-in type unit adapted to be interchanged with another plug-in as desired by the user in changing from one type of signal to another.

References Cited

UNITED STATES PATENTS

| | | | |
|---|---|---|---|
| 2,603,900 | 7/1951 | Kellett | 43—17 |
| 3,012,354 | 12/1961 | Hansen | 43—17 |
| 3,216,142 | 11/1965 | Kricksfeld et al. | 43—17 |
| 3,228,135 | 1/1966 | Kricksfeld et al. | 43—17 |

SAMUEL KOREN, Primary Examiner

DANIEL J. LEACH, Assistant Examiner